United States Patent
Dhara et al.

(10) Patent No.: US 7,734,028 B2
(45) Date of Patent: Jun. 8, 2010

(54) METHOD AND APPARATUS FOR DELIVERING ENHANCED CALLER IDENTIFICATION SERVICES TO A CALLED PARTY

(75) Inventors: Krishna K. Dhara, Dayton, NJ (US); Gary Hildebrand, Monmouth Junction, NJ (US); Venkatesh Krisnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1297 days.

(21) Appl. No.: 10/955,907

(22) Filed: Sep. 30, 2004

(65) Prior Publication Data

US 2005/0100150 A1    May 12, 2005

Related U.S. Application Data

(63) Continuation-in-part of application No. 10/261,242, filed on Sep. 30, 2002, now abandoned.

(51) Int. Cl.
 H04M 1/56     (2006.01)
 H04M 15/06   (2006.01)
 H04M 3/00    (2006.01)

(52) U.S. Cl. .................. 379/142.06; 379/142.04; 379/142.14; 379/245

(58) Field of Classification Search ......... 379/88.19, 379/88.21, 93.23, 142.01, 142.06, 142.09, 379/142.14, 142.16, 142.17, 245, 247, 142.04
See application file for complete search history.

(56) References Cited

U.S. PATENT DOCUMENTS

| | | | |
|---|---|---|---|
| 5,724,412 A * | 3/1998 | Srinivasan | 379/93.23 |
| 5,771,283 A | 6/1998 | Chang et al. | |
| 5,907,604 A | 5/1999 | Hsu | |
| 5,978,806 A | 11/1999 | Lund | |
| 6,137,870 A * | 10/2000 | Scherer | 379/127.06 |
| 6,192,116 B1 | 2/2001 | Mayak | |
| 6,442,263 B1 * | 8/2002 | Beaton et al. | 379/142.04 |
| 6,510,215 B1 * | 1/2003 | Hendrickson | 379/142.15 |
| 6,650,901 B1 | 11/2003 | Schuster et al. | 455/456.1 |
| 6,888,927 B1 * | 5/2005 | Cruickshank et al. | 379/88.11 |
| 7,046,691 B1 * | 5/2006 | Kadyk et al. | 370/466 |

(Continued)

FOREIGN PATENT DOCUMENTS

EP    0 869 688 A2   10/1998

(Continued)

OTHER PUBLICATIONS

U.S. Appl. No. 10/261,242, filed Sep. 30, 2002, Khakoo et al.

(Continued)

*Primary Examiner*—Binh K Tieu
(74) *Attorney, Agent, or Firm*—Joseph B. Ryan; Jason Paul DeMont; Wayne S. Breyer

(57) ABSTRACT

Methods and apparatus are disclosed for delivering enhanced caller information to a called party. A user document associated with a calling party is provided to the called party as part of signaling information associated with the call, such as a SIP invite message. The user document may be, for example, a vCard or vCalendar.

9 Claims, 5 Drawing Sheets

U.S. PATENT DOCUMENTS

| | | | | |
|---|---|---|---|---|
| 7,188,073 | B1 * | 3/2007 | Tam et al. | 705/9 |
| 2002/0067812 | A1 | 6/2002 | Fellingham et al. | |
| 2002/0067816 | A1 * | 6/2002 | Bushnell | 379/201.02 |
| 2002/0131566 | A1 * | 9/2002 | Stark et al. | 379/88.19 |
| 2003/0112952 | A1 | 6/2003 | Brown et al. | |
| 2003/0118175 | A1 * | 6/2003 | Hariri et al. | 379/355.02 |
| 2003/0231749 | A1 * | 12/2003 | Ansley et al. | 379/93.17 |
| 2004/0032946 | A1 * | 2/2004 | Koser et al. | 379/373.01 |

FOREIGN PATENT DOCUMENTS

WO     WO 99/00751     1/1999

OTHER PUBLICATIONS

Taylor, Barry W., "U.S. Appl. No. 10/261,242 Notice of Abandonment Nov. 19, 2008", , Publisher: USPTO, Published in: US.

Taylor, Barry W., "U.S. Appl. No. 10/261,242 Advisory Action Nov. 25, 2005", , Publisher: USPTO, Published in: US.

Taylor, Barry W., "U.S. Appl. No. 10/261,242 Decison on Appeal Sep. 15, 2008", , Publisher: USPTO, Published in: US.

Taylor, Barry W., "U.S. Appl. No. 10/261,242 Examiner's Answer Brief Apr. 26, 2006", , Publisher: USPTO, Published in: US.

Taylor, Barry W., "U.S. Appl. No. 10/261,242 Office Action Jan. 26, 2005", , Publisher: USPTO, Published in: US.

Taylor, Barry W., "U.S. Appl. No. 10/261,242 Office Action Sep. 12, 2005", , Publisher: USPTO, Published in: US.

* cited by examiner

510 {
```
INVITE sip:someone@somewhere.com SIP/2.0
Via: SIP/2.0/UDP somewhere.com;branch=z9hG4bK392039842
To: sip:someone@somewhere.example
From: sip:me@here.com;tag=39092342
Call-ID: 2203900ef0299349d92091023a
CSeq: 1 INVITE
Max-Forwards: 70
Contact: <sip:me@mymachine.here.com>
Content-Type: multipart/mixed; boundary=unique-boundary-1
Content-Length: (appropriate value)
```
}

520 {
```
--unique-boundary-1
Content_Type: application/sdp
Content-Length: <length>
sdp --unique-boundary-1
Content_Type: application/vCard
Content-Length: <length>
vcard
```
} 525

FIG. 6

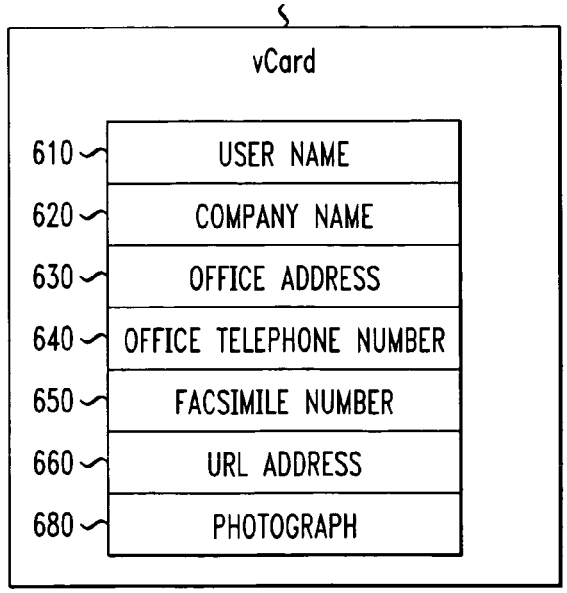

METHOD AND APPARATUS FOR DELIVERING ENHANCED CALLER IDENTIFICATION SERVICES TO A CALLED PARTY

CROSS REFERENCE TO RELATED APPLICATIONS

The present application is a continuation-in-part application of U.S. patent application Ser. No. 10/261,242 filed Sep. 30, 2002, now abandoned, entitled "Method and Apparatus for Delivering Enhanced Caller Identification Services to a Called Party," incorporated by reference herein.

FIELD OF THE INVENTION

The present invention relates generally to communication networks, and more particularly, to methods and systems for delivering enhanced caller identification services to a called party.

BACKGROUND OF THE INVENTION

Modern telephone systems generally provide a caller identification feature for identifying the calling party. Caller ID services have become very popular with both residential and business customers. Caller ID services are especially valuable to businesses that use caller ID information to access customer records associated with an incoming call or to route an incoming call to specific customer representatives based on characteristics of the caller, such as a geographic location of the caller. In addition, residential customers frequently employ the caller ID feature to screen unwanted incoming calls.

Generally, customers register for a caller ID service with their telephone service provider. Typically, the customer is connected to the facilities of a service provider through a central office switch. If a called party subscribes to the caller ID service, information about the caller is automatically displayed on a display associated with the telephone of the called party whenever a call is received.

The information displayed about the caller is typically limited to the caller's name or telephone number (or both). U.S. Pat. No. 5,771,283 to Chang et al., entitled "Method for Delivering Enhanced Caller Identification Service in a Telecommunications Network," discloses a method for delivering enhanced caller identification services to a subscriber. Chang et al. extend the conventional caller ID feature to include information about the geographic location of the caller. Generally, if a called party subscribes to the enhanced caller ID service proposed by Chang et al., the directory number of the calling party is supplemented with geographic identification data associated with the originating switch, so that the true geographic location of the caller can be ascertained.

U.S. patent application Ser. No. 10/261,242, entitled "Method and Apparatus for Delivering Enhanced Caller Identification Services to a Called Party," discloses a caller ID system that provides a user document address to a called party. The user document address is a pointer or hyperlink, such as a uniform resource locator (URL), to a user document containing additional information about the calling party. While the disclosed caller ID system extends the caller ID information that is presented to a called party, the called party must use the address to access the identified document. For example, in a URL implementation, the called party must have an active Internet connection to obtain the document identified by the URL.

A need therefore exists for an improved method and apparatus for delivering enhanced caller identification services to a called party.

SUMMARY OF THE INVENTION

Generally, a method and apparatus are disclosed for delivering enhanced caller information to a called party. The present invention extends the caller ID information that is presented to a called party to include a user document address containing additional information about the calling party. The user document may be, for example, a vCard or vCalendar. Thus, the present invention provides a convenient mechanism for providing desired additional information to a called party.

According to one method of the invention, a user document associated with a calling party is provided to the called party as part of signaling information associated with the call. For example, the user document may be included in the body of a SIP invite message.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample SIP invite message incorporating aspects of the present invention;

FIG. 6 illustrates an exemplary vCard in accordance with one embodiment of the present invention;

DETAILED DESCRIPTION

Figure 1:
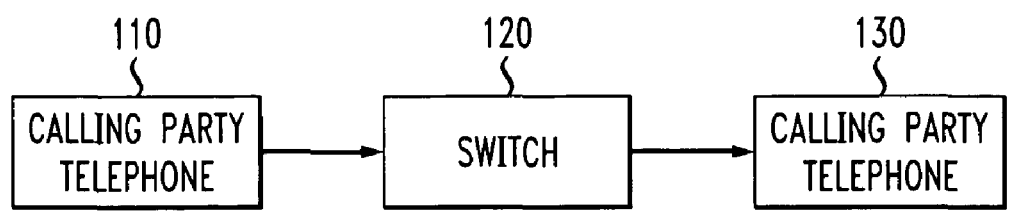
FIG. 1 illustrates an exemplary network environment in which the present invention can operate.

FIG. 1 illustrates an exemplary network environment in which the present invention can operate. As shown in FIG. 1, a calling party 110 calls a called party 130 and the call is routed through at least one switch 120, discussed below in conjunction with FIG. 2. According to one aspect of the present invention, the caller ID information that is presented to the called party 130 is extended to include a user document, such as a vCard or vCalendar, containing additional information about the calling party 110.

The user document contains appropriate information that the calling party 110 would like to be presented to the called party 130, for example, on the telephone of the called party 130 or an associated computing device or display, such as a personal computer or personal digital assistant (PDA). The user document may include text, images or audio or any combination of the foregoing. As discussed herein, the present invention is particularly suitable for use with available and emerging Internet technologies, such as the hypertext transfer protocol (HTTP) or a similar Internet protocol for accessing documents, voice over IP (VoIP) or the Session Initiation Protocol (SIP), described, for example, in M. Handley et al., "SIP: Session Initiation Protocol," RFC 2543 (March 1999). The user document may include presence information of the calling party 110, such as information recorded in a SIP registry, or a virtual business card or calendar of the calling party 110.

A number of techniques have been proposed or suggested to ease the exchange of documents. The Internet Mail Consortium (www.imc.org), for example, provides the vCard and vCalendar standards. vCards are intended to automate the exchange of personal information typically found on a traditional business card. vCards have been used in many applications, including Internet mail, voice mail, Web browsers and telephony applications. vCard information typically includes text and images, such as a company logo. For a detailed discussion of the vCard specifications, see, for example, RFC 2425, "MIME Content-Type for Directory Information" and RFC 2426, "vCard MIME Directory Profile." vCards generally store directory information such as a user name, one or more addresses (business, home, mailing, parcel), one or more telephone numbers (home, business, fax, pager, cellular, ISDN, voice, data, video), one or more email addresses and Internet URLs (Universal Resource Locators).

Similarly, vCalendar defines a transport and platform-independent format for exchanging calendaring and scheduling information. vCalendar documents typically contain information about event and "to-do" items. Programs that use vCalendar can exchange important data about events in order to schedule meetings with anyone having a vCalendar compatible program. For a detailed discussion of the vCalendar specifications, see, for example, RFC 2445, "Internet Calendaring and Scheduling Core Object Specification (iCalendar)," RFC 2446, "iCalendar Transport-Independent Interoperability Protocol (iTIP): Scheduling Events, BusyTime, To-dos and Journal Entries," and RFC 2447 "iCalendar Message-based Interoperability Protocol (iMIP)."

While the present invention is illustrated below in conjunction with the processing of calls in an exemplary enterprise communication system, it is not limited to use with any particular configuration of system elements or communication processing application. Those skilled in the art will recognize that the disclosed techniques may be used in any communication system application in which it is desirable to provide enhanced caller ID information to a called party 130. Thus, the term "switch" as used herein should be understood to include a private-branch exchange (PBX) system, an enterprise switch, or other type of telecommunications system switch, as well as other types of processor-based communication control devices. The term "call" as used herein is intended to include not only incoming or outgoing telephone calls but also non-telephonic communications such as data transmissions, voice-over-IP, e-mail or facsimile.

Current caller ID mechanisms typically derive the Caller ID from the calling device. In such an implementation, any association between the calling device and a user has to be pre-established at the system level. This association tends to be static and one-to-one. Thus, all calls placed from a particular telephone are associated with a single user identity (or role) regardless of the person actually making the call. According to another aspect of the present invention, the user can configure the caller ID information that is included with a call. For example, the user can configure the caller ID information to include the user's personal vCard document in accordance with the present invention.

In addition, with current caller ID mechanisms, caller ID information is communicated only once at the time of call establishment and is unidirectional from the calling party 110 to the called party 130. Thus, such systems do not allow for user-controlled exchange of identity information among the parties in the call. According to yet another aspect of the invention, the calling party 110 or the called party 130 can exchange a document in the signaling information at any time during a call. For example, a document can be exchanged during a call as the body of a SIP message or by establishing another channel between the two parties (assuming the VOIP protocol provides the identities of the parties). The authentication of the two parties during the call establishment can be reused while transferring the document.

In the exemplary embodiment, the devices employed by the calling party 110 or the called party 130 (or both) can provide a mechanism for receiving a vCard from the user. For example, the device may be a telephone device with an infrared port for receiving vCards from a personal digital assistant (PDA) or a laptop computer; a telephone device that includes a storage medium containing one or more vCards; or a telephone device can import a vCard file stored in a network-attached file system. In addition, each device or entity that receives a vCard or another user document in a signaling message associated with a call provides a mechanism for storing, displaying or otherwise presenting the vCard or document to the user. For example, the device may be capable of transmitting the incoming vCard to a PDA or computer over an infrared port. Alternatively, the device may be able to store the incoming vCard on a local or network-attached storage or file system. In yet another embodiment, each device may provide a mechanism for initiating a contact to a user using one or more of the contact addresses listed in a vCard. For example, a phone device may be capable of originating a phone call by automatically activating the "phone number" component of a vCard file.

According to a further aspect of the invention, the user document is provided to a number of different participants in a conference call. In this manner, the document exchange aspect of the present invention may be applied in a point-to-point environment (i.e., a two party call) or with multiple users in a conference call.

Figure 2:
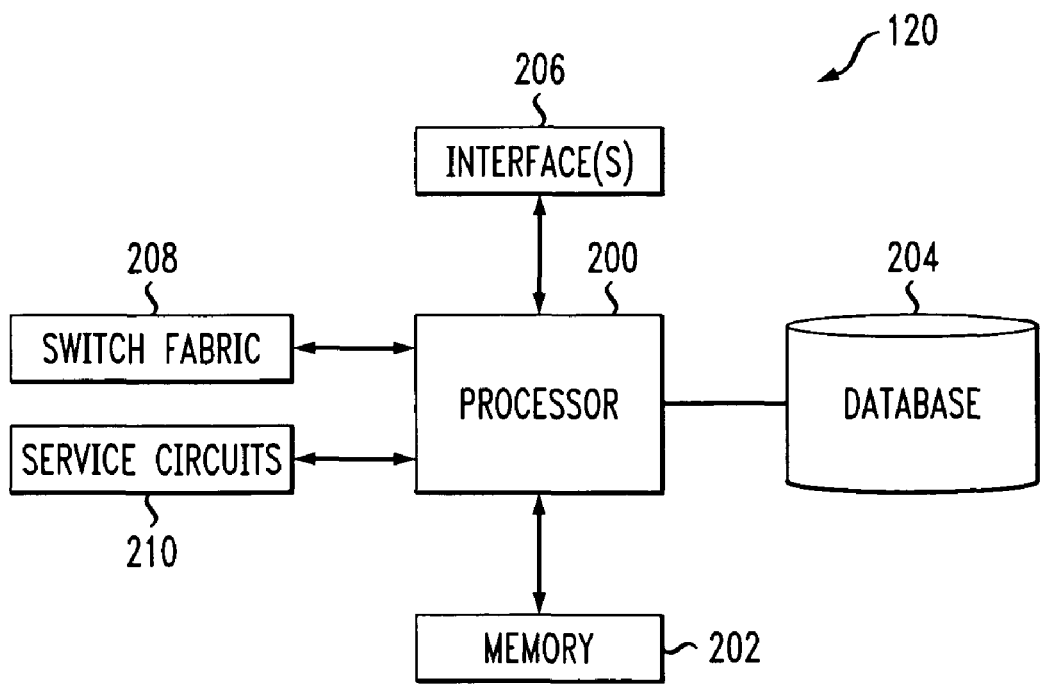
FIG. 2 is a schematic block diagram of an exemplary switch incorporating features of the present invention.

FIG. 2 is a schematic block diagram of an exemplary switch 120 incorporating features of the present invention. The switch 120 may be embodied, for example, as a DEFINITY® Enterprise Communication Service (ECS) communication system switch, available from Avaya Inc. of Basking Ridge, N.J., USA, as modified herein to provide the features and functions of the present invention. While the present invention is illustrated in the context of a SIP-enabled switch 120, other types of known switches may be utilized, as modified herein to support the features and functions of the present invention. In particular, such known switches must be extended to support the direction of a calling party's document to the called party 130 with a call in accordance with the present invention. The conventional aspects of such switches are well known in the art and therefore not described in detail herein. The switch 120 may be connected to one or more external endpoints, e.g., external terminals or system processing elements, via a network (not shown) or other suitable communication channel(s).

As shown in FIG. 2, the exemplary switch 120 includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing processing and other functions within the switch 120. Such programs may be stored in memory 202 or another storage device accessible to the switch 120 and executed by processor 200 in a conventional manner.

The database 204 may be; e.g., an optical or magnetic disk-based storage device, or other conventional storage device associated with or otherwise accessible to the switch 120. The database 204 may be used to store, e.g., feature assignments to particular feature buttons or codes, directory number assignments to corresponding call appearances or direct facility termination keys, access restrictions, and other administrative information regarding the configuration of the system, as well as other types of information. The service circuits 210 may include tone generators, announcement circuits, etc. These circuits and the interfaces 206 are controlled by processor 200 in implementing call processing functions in the switch 120. The switch 120 may include additional elements that are omitted from FIG. 2 for simplicity and clarity of illustration. For example, the switch may include a port card for each type of user terminal associated therewith. In addition, it will be appreciated by those skilled in the art that the switch 120 may be configured to support multiple user terminals of different types, e.g., wired deskset terminals, wireless deskset terminals, personal computers, video telephones or other advanced terminals, etc. Also associated with the switch 120 may be an administrator terminal (not shown) that is used to program the operation of the switch 120 during a system administration, e.g., an initial set-up and configuration of the system or a subsequent system-level or user-level reconfiguration.

Other devices not shown in the figures may be associated with the switch 120, such as an adjunct feature server. Such an adjunct may be physically incorporated within the switch, and may be partially or completely implemented using other switch elements such as processor 200 and memory 202.

Figure 3:
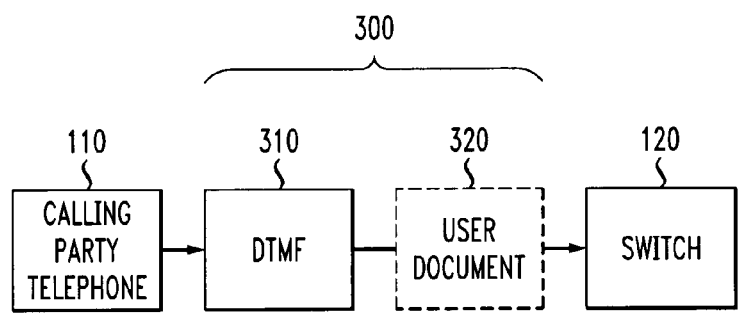
FIG. 3 illustrates an exemplary signal transmitted from the calling party to the switch in accordance with one embodiment of the present invention.

FIG. 3 illustrates an exemplary signal 300 transmitted from the calling party 110 to the switch 120 in accordance with one embodiment of the present invention. As shown in FIG. 3, the exemplary signal 300 sent by the telephone of the calling party 110 to the switch 120 includes dual tone multiple frequency (DTMF) tones 310 and a user document 320. The DTMF tones 310 correspond to the telephone number of the called party 130, as entered by the calling party 110 using the keypad of the telephone, in a known manner. It is noted that the user document 320 may be included in the signal 300 by the telephone of the calling party 110 or by the switch 120, as would be apparent to a person of ordinary skill in the art. Generally, the user document 320 may be a static document associated with the calling party 110, such as the vCard, a default document created in accordance with predefined default document content rules or a dynamic document based on one or more rules that alter the content of the user document based on properties of the call or called party.

Figure 4:
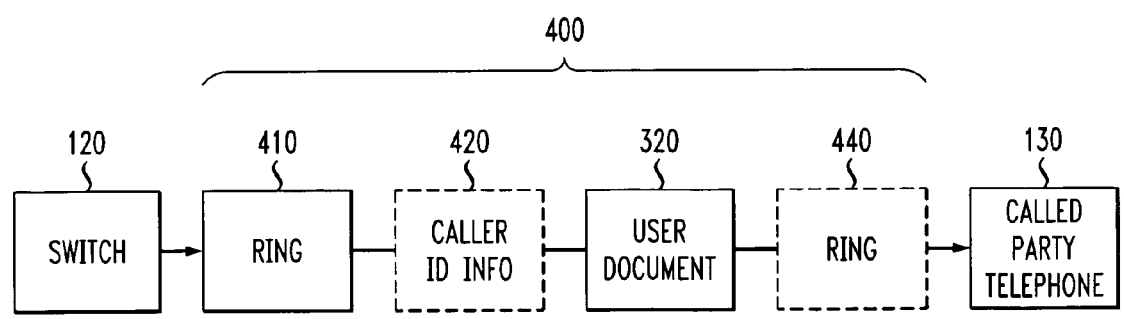
FIG. 4 illustrates an exemplary signal transmitted by the switch to the telephone of the called party in accordance with one embodiment of the present invention.

FIG. 4 illustrates an exemplary signal 400 transmitted by the switch 120 to the telephone of the called party 130 in accordance with one embodiment of the present invention. As shown in FIG. 4, the exemplary signal 400 generated by the switch 120 includes a user document 320 in accordance with the present invention that accompanies one or more rings 410, 440, in addition to any conventional caller ID information 420. It is noted that the user document 320 of the present invention may optionally supercede any conventional caller ID information that is traditionally provided with the call.

FIG. 5 illustrates a sample SIP invite message 500 incorporating aspects of the present invention. In the SIP protocol, the SIP invite message 500 is used to convey the signaling information. As shown in FIG. 5, the SIP invite message 500 includes a header portion 510 and a body portion 520. The header portion 510 may be implemented in a conventional manner in accordance with the SIP protocol. As shown in FIG. 5, the body portion 520 is extended herein to include a section 525 for storing a vCard. An exemplary vCard is discussed further below in conjunction with FIG. 6.

FIG. 6 illustrates an exemplary vCard 600. As shown in FIG. 6, the vCard 600 records a user name 610, a company name 620, an office address 630, office telephone number 640, facsimile number 650, URL address 660 and a photograph 680. While the vCard 600 illustrates one implementation of the present invention, the user document 320 can include any document that stores user identity and contact information with appropriate formatting labels to identify the various components.

Figure 7:
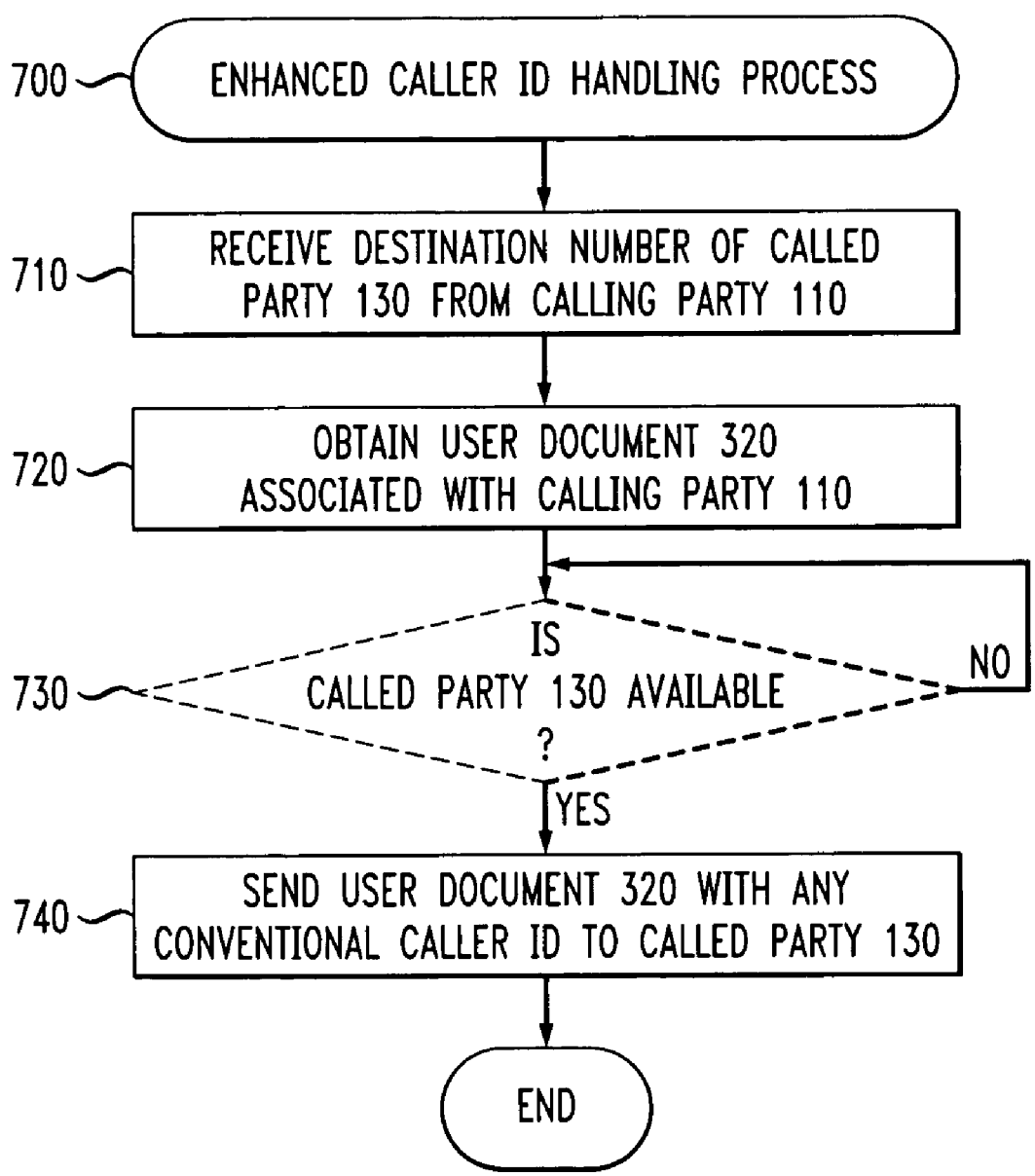
FIG. 7 is a flow chart describing an exemplary enhanced caller ID handling process implemented by the switch of FIG. 1.

FIG. 7 is a flow chart describing an exemplary enhanced caller ID handling process 700 implemented by the switch 120 of FIG. 1. As shown in FIG. 7, the switch 120 initially receives the destination number of the called party 130 during step 710 and obtains the user document 320 corresponding to the calling party 110 during step 720. As previously indicated, the user document 320 may be stored by the calling party 110 and appended to the signal 300 or may be retrieved by the switch 120, as would be apparent to a person of ordinary skill in the art.

A test is optionally performed during step 730 to determine if the telephone of the called party 130 identified by the received destination number is available. If it is determined during step 730 that the telephone of the called party 130 is not available, for example, if the telephone of the called party 130 is busy, then the switch 120 waits a predefined interval and retries the number or employs caller ID/calling waiting techniques. A message can be sent to the calling party 110 indicating that the called party 130 is not available and should wait while the switch 120 retries. The switch 120 can optionally call back the calling party 110 when the called party 130 becomes available.

If, however, it is determined during step 730 that the telephone of the called party 130 is available, then the user document 320 is sent with any conventional caller ID information in the signal 400 to the called party 130 (as shown in FIG. 4). The manner in which the user document 320 and caller ID information is processed by the called party 130 is discussed in conjunction with FIG. 8.

Figure 8:
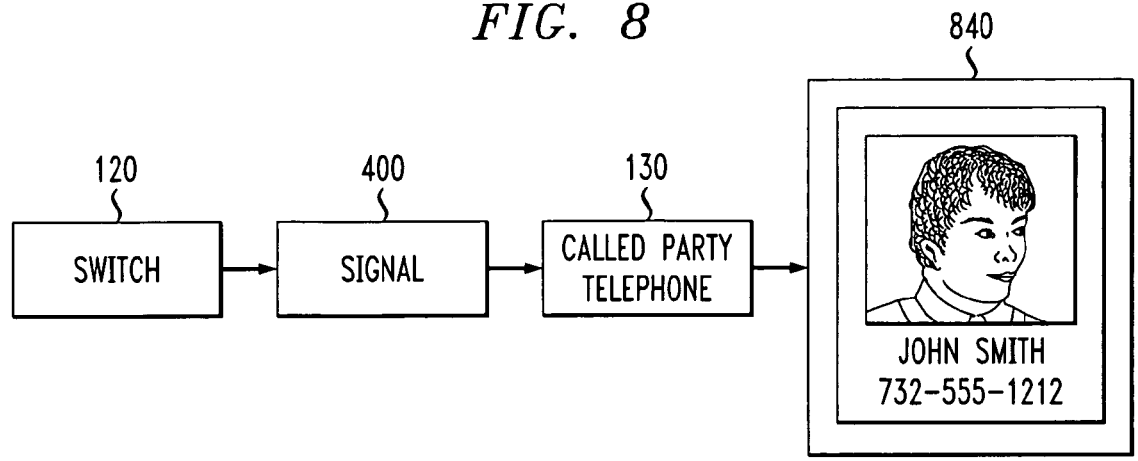
FIG. 8 illustrates the manner in which the user document of the present invention is processed by the called party.

As shown in FIG. 8, the called party 130 receives an incoming signal 400 from the switch 120 that includes a user document 320 in addition to any conventional caller ID information, in accordance with the present invention. The telephone unit of the called party 130 retrieves the user document 320 from the signal 400. The user document is rendered to the called party 130, for example, on a display 840 associated with the telephone or another device of the called party 130. In this manner, the content of the user document 320 is displayed to the called party 130.

Figure 9:
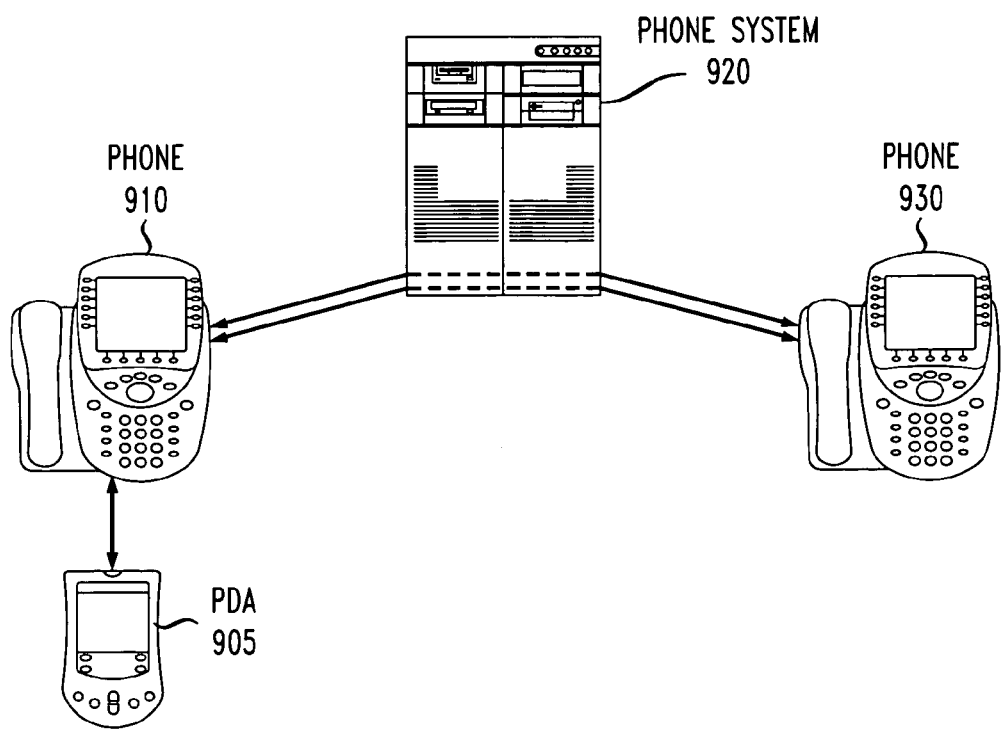
FIG. 9 illustrates the flow of information according to one embodiment of the present invention.

FIG. 9 illustrates the flow of information according to one embodiment of the present invention. As shown in FIG. 9, the calling party 110, employing a telephone 910, calls the called party 130, employing a telephone 930, and the call is routed through at least one switch 920, such as the switch described above in conjunction with FIG. 2. The caller ID information that is presented to the called party 130 is extended to include a user document, such as a vCard or vCalendar, containing additional information about the calling party 110. In one implementation, the calling party 110 can transfer the vCard over an Infrared link from a PDA 905 to the telephone 910. Thereafter, as part of the call establishment, or during the call itself, the calling party 110 can send the vCard to the telephone 930 of the called party 130 as part of the signaling message exchange, for example, using the SIP invite message 500 discussed above. Finally, when the called party 110 receives the vCard on the telephone 930 the vCard can be displayed on the telephone 930 or an associated device, and/or stored in a local or network-attached file system.

In one implementation that exchanges vCalendars, the users (or applications on behalf of users that answer calls) can process the vCalendars of each user and schedule a mutually convenient time for an appointment for both parties.

It is noted that while the exemplary embodiments described herein contemplate the use of textual or image-based user documents, the user documents may also be embodied using other media, such as audio, in addition to or instead of text or image information.

It is to be understood that the embodiments and variations shown and described herein are merely illustrative of the principles of this invention and that various modifications may be implemented by those skilled in the art without departing from the scope and spirit of the invention.

We claim:

1. A method comprising:
    generating, at a server, a caller ID document based on a predefined document content rule, wherein:
    a. the caller ID document is generated when a telephone call to a called party is initiated,
    b. the document content rule identifies an information item that must be included in the caller ID document, and
    c. the document content rule is independent of the called party;
    receiving at a switch (i) a telephone number of the called party and (ii) an address of the caller ID document; and
    transmitting from the switch to the called party telephone (i) an incoming-call alert and (ii) the address of the caller ID document.

2. The method of claim 1, wherein the document comprises one or more media.

3. The method of claim 1, wherein the document is a vCard.

4. The method of claim 1, wherein the document is a vCalendar.

5. The method of claim 4, wherein said provided vCalendar is used to schedule a mutually convenient appointment between the calling party and the called party.

6. The method of claim 1, wherein the document is provided after the call is established with the called party.

7. The method of claim 1, wherein the signaling information is a SIP invite message.

8. The method of claim 1, wherein the call is a conference call.

9. The method of claim 8, wherein the document is provided to a plurality of participants in the conference call.

* * * * *